(12) United States Patent
Engler et al.

(10) Patent No.: US 9,266,413 B2
(45) Date of Patent: Feb. 23, 2016

(54) OPENING AND/OR CLOSING DEVICE

(75) Inventors: Friedhelm Engler, Hochheim (DE);
Clarence Kim, Wiesbaden (DE);
Richard Shaw, Koengernheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 460 days.

(21) Appl. No.: 13/604,398

(22) Filed: Sep. 5, 2012

(65) Prior Publication Data

US 2013/0062913 A1     Mar. 14, 2013

(30) Foreign Application Priority Data

Sep. 8, 2011   (DE) .......................... 10 2011 112 571

(51) Int. Cl.
*B60J 5/02*   (2006.01)
*B60J 5/04*   (2006.01)
*B60J 7/16*   (2006.01)

(52) U.S. Cl.
CPC ................ *B60J 5/047* (2013.01); *B60J 7/1657* (2013.01); *B60J 7/1635* (2013.01)

(58) Field of Classification Search
CPC ............... B60J 1/008; B60J 5/02; B60J 7/08; B60J 7/16; B60J 7/1628; B60J 7/1635; B60J 7/165; B60J 7/1657; B62J 17/04; B62J 17/08; B62J 2017/086
USPC .............. 296/77.1, 78.1, 9, 80, 146.8, 193.12
See application file for complete search history.

(56) References Cited

U.S. PATENT DOCUMENTS

| | | | | | |
|---|---|---|---|---|---|
| 1,935,993 | A | * | 11/1933 | Reutter | 296/26.05 |
| D151,796 | S | * | 11/1948 | Sullivan | D12/91 |
| 2,542,605 | A | * | 2/1951 | Werner | 296/146.12 |
| 2,656,214 | A | * | 10/1953 | Alamagny | 296/193.01 |
| 2,777,728 | A | * | 1/1957 | Barenyi | 296/193.12 |
| 2,822,214 | A | * | 2/1958 | Rivolta | 296/146.8 |
| 2,947,567 | A | * | 8/1960 | Barenyi | 296/193.12 |
| 3,979,147 | A | * | 9/1976 | Kelley | 296/78.1 |
| 5,806,622 | A | * | 9/1998 | Murphy | 180/210 |
| 5,842,732 | A | * | 12/1998 | Daggett et al. | 296/102 |
| 6,749,926 | B1 | * | 6/2004 | Yoshizawa | 428/174 |

(Continued)

FOREIGN PATENT DOCUMENTS

| | | | | | |
|---|---|---|---|---|---|
| DE | 810110 | C | * | 8/1951 | B62J 17/08 |
| DE | 816637 | C | * | 10/1951 | B60J 5/02 |
| DE | 883244 | C | * | 7/1953 | B60J 5/02 |

(Continued)

*Primary Examiner* — Glenn Dayoan
*Assistant Examiner* — Paul Chenevert
(74) *Attorney, Agent, or Firm* — Ingrassia Fisher & Lorenz PC

(57) ABSTRACT

An opening and/or closing device for a movable, flexurally rigid and at least regionally transparent wall element of a motor vehicle is provided. The device includes at least one supporting arm and at least one supporting body. The supporting arm and the supporting body encompass a first end that faces the wall element and is pivoted to the wall element, and encompass a second end that faces away from the wall element and is pivoted to a vehicle structure. By turning the supporting arm and the supporting body, the wall element is moved from an open functional position, in which a vehicle interior is accessible from outside for entry and/or egress and in which the wall element is situated in a frontal area of the motor vehicle, into a closed functional position, in which the vehicle interior is sealed to the outside by the wall element.

19 Claims, 3 Drawing Sheets

(56) References Cited

U.S. PATENT DOCUMENTS

| | | | |
|---|---|---|---|
| 7,055,885 B2 * | 6/2006 | Ishihara et al. | 296/146.4 |
| 2012/0070624 A1 * | 3/2012 | Payen et al. | 428/172 |

FOREIGN PATENT DOCUMENTS

| | | | | |
|---|---|---|---|---|
| DE | 931928 C * | 8/1955 | | B60J 5/02 |
| DE | 1010391 B * | 6/1957 | | B60J 5/00 |
| DE | 4135585 A1 | 5/1993 | | |
| DE | 4232239 A1 * | 3/1994 | | B62J 17/04 |
| DE | 4306094 A1 | 9/1994 | | |
| DE | 9413375 U1 * | 12/1994 | | B62D 39/00 |
| DE | 29618147 U1 * | 2/1997 | | B62J 17/00 |
| DE | 10131632 A1 * | 1/2003 | | B62J 27/00 |
| DE | 10204663 A1 | 8/2003 | | |
| DE | 20319225 U1 | 3/2004 | | |
| DE | 102004059347 A1 | 6/2006 | | |
| DE | 102008018440 A1 | 10/2009 | | |
| EP | 1752367 A2 * | 2/2007 | | B62J 17/04 |
| EP | 2374698 A1 * | 10/2011 | | B62D 31/00 |
| FR | 851910 A * | 1/1940 | | B60J 5/02 |
| FR | 1370077 A | 8/1964 | | |
| FR | 1506602 A * | 12/1967 | | B60J 5/02 |
| FR | 2115118 A1 * | 7/1972 | | B62D 31/00 |
| FR | 2139775 A1 * | 1/1973 | | B60J 5/02 |
| FR | 2240629 A5 * | 3/1975 | | B60J 5/02 |
| FR | 2703005 A1 * | 9/1994 | | B60J 5/12 |
| FR | 2748254 A1 * | 11/1997 | | B62J 17/08 |
| FR | 2964078 A1 | 3/2012 | | |
| GB | 1168443 A * | 10/1969 | | B60J 5/02 |
| JP | 5441044 B1 * | 3/2014 | | B62D 27/00 |
| WO | WO 2004039658 A1 * | 5/2004 | | B62J 17/00 |

* cited by examiner

OPENING AND/OR CLOSING DEVICE

CROSS-REFERENCE TO RELATED APPLICATION

This application claims priority to German Patent Application No. 10 2011 112 571.3, filed Sep. 8, 2011, which is incorporated herein by reference in its entirety.

TECHNICAL FIELD

The technical field generally relates to an opening and/or closing device for a movable, flexurally rigid and at least regionally transparent wall element, such as a vehicle roof, in particular a dome, of a motor vehicle.

BACKGROUND

Known in the art are glass domes, which are essentially shifted along the longitudinal axis of the vehicle for opening and closing purposes. It has here proven disadvantageous that the contour of the motor vehicle must allow the glass dome to open and close.

For example, a non-generic opening and/or closing device is known for convertibles, in which a foldable vehicle roof is stowed in the rear section, guided out of the rear section to an upper section of a window front for closing purposes, and fixed in place there.

It has here proven disadvantageous that structural designs like these only offer technically feasible solutions for foldable wall elements.

At least one object herein is to provide an opening and/or closing device for a movable, flexurally rigid and at least regionally transparent wall element with which a vehicle interior can be easily opened up and easily closed up again.

SUMMARY

In accordance with an exemplary embodiment, an opening and/or closing device for a movable, flexurally rigid and at least regionally transparent wall element, such as a vehicle roof, in particular a dome, of a motor vehicle, is provided. The opening and/or closing device has at least one supporting arm and at least one supporting body, which each encompass a first end that faces the movable wall element and can be or is pivoted to the wall element, and which each encompass a second end that faces away from the movable wall element and can be or is pivoted to a vehicle structure. By turning the supporting arm and supporting body, the wall element can be moved from an open functional position, in which a vehicle interior is accessible from outside for entry and/or egress and in which the wall element is situated in a frontal area of the motor vehicle, into a closed functional position, in which the vehicle interior is sealed to the outside by the wall element.

For example, the wall element can encompass a vehicle roof The latter can be designed as a glass or plastic dome, and encompass a continuous, transparent pane area.

For example, the frontal area of the motor vehicle can be arranged between a passenger cabin and the front end of the motor vehicle. Furthermore, the area of the front end of the motor vehicle can also protrude at least slightly.

In an embodiment, the supporting arm and supporting body are rotatable in any direction, so as to move the wall element into the open or closed functional position, and fix it in place therein. However, it proves advantageous that the rotation of the at least one supporting arm and at least one supporting body take place in a plane parallel to the longitudinal vehicle plane.

Because the wall element can be moved from the open functional position into the closed functional position by way of a rotational movement, opening and closing are essentially independent of the contour of the motor vehicle.

For example, the vehicle structure can encompass the body, a body element or a module situated in the interior of the motor vehicle.

In another embodiment, the second end of the supporting arm and second end of the supporting body are arranged at the same height in relation to the vehicle front as viewed in the longitudinal direction of the motor vehicle. However, it is preferred that the at least one supporting arm and the at least one supporting body be spaced apart as viewed in the longitudinal direction of the motor vehicle, and/or that the at least one supporting arm be spaced less far apart from the vehicle front than the at least one supporting body.

In addition, the second end of the supporting arm and the second end of the supporting body can exhibit the same or different distance from the vehicle floor.

In a further embodiment, the at least one supporting arm and at least one supporting body encompass the same rotational direction or an opposite rotational direction while moving the wall element from the closed functional position into the open functional position or from the open functional position into the closed functional position.

In an embodiment, the at least one supporting arm and the at least one supporting body exhibit a longitudinal extension in the direction running from the first end toward the second end. It here proves advantageous for the at least one supporting arm and the at least one supporting body to exhibit the same or a mutually deviating longitudinal extension, and/or for the at least one supporting arm to exhibit less of a longitudinal extension than the at least one supporting body.

If the supporting arm exhibits less of a longitudinal extension than the at least one supporting body, and the supporting arm exhibits less of a distance away from the vehicle front than the at least one supporting body, the wall element tilts into the open functional position when moved from the closed functional position, around the first end of the at least one supporting arm. This turns the wall element, rotating it from a horizontal arrangement in the direction toward a vertical arrangement. As a consequence, the wall projects only slightly over the motor vehicle or not at all in the open functional position, thereby reducing the space required for opening and closing the wall element.

In an exemplary embodiment, the wall element in the open functional position is turned by nearly 90° in relation to the closed functional position. However, it proves expedient and sufficient for the rotation to encompass an angle of between 30° and 80°, particularly 35° and 70°, preferably 40° to 60°.

For example, in a case where a vehicle is parked, and another motor vehicle is located in front of the vehicle, this makes it possible to open and again close the wall element without touching the motor vehicle in front.

In addition, it proves advantageous for the at least one supporting body to form at least one lateral wall section of the motor vehicle at least in the closed functional position of the wall element.

Furthermore, the at least one supporting body can exhibit a jacket, in particular one that encompasses a cavity, which accommodates in particular a metallic bearing structure for absorbing the acting forces.

Because the supporting body comprises at least one lateral wall section of the motor vehicle, it is easier to get in and out of the motor vehicle when the wall element is arranged in the open functional position, so that the supporting body opens up the previously covered lateral wall section. This further facilitates entry and egress.

Since the supporting body encompasses a jacket exhibiting a cavity, the supporting body can be designed to take up a lot of space, without having to weigh a great deal as a result.

In another embodiment, the second end of the at least one supporting body exhibits a supporting body bearing means, which consists in particular of a roller bearing. In addition, the second end of the at least one supporting body can encompass a damping means, whose free end is fixed to the vehicle structure.

The damping means makes it possible to attenuate and cushion an opening motion or closing motion. In such a case, the damping means can encompass a spring. As a result, a user is greeted by a soft motion perceived as appealing when opening or closing the wall element.

In a further embodiment, the at least one supporting arm and at least one supporting body are capable of moving the wall element from the open functional position into the closed functional position either manually or driven, in particular continuously, and/or the at least one supporting arm and/or at least one supporting body can be actuated by a drive unit equipped with a motor, in particular an electric motor.

For example, the drive unit can be an internal combustion engine or electromotive drive. The latter can be separately allocated to the opening and/or closing device, or use the driving energy from an existing drive unit, for example an internal combustion engine, such as a fuel cell, or an electric motor of the motor vehicle.

In an embodiment, the wall element is fixable in a ventilation position, in which a gap is formed between the wall element and vehicle interior.

This makes it possible to easily ventilate the vehicle interior, thereby eliminating the necessity of providing an additional ventilation device for the motor vehicle.

An another embodiment provides that the second end of the supporting arm is arranged on a drive shaft in a torque-proof manner, which encompasses at least a first energy transmission segment, in particular a toothed wheel, which can transmit energy from a second energy transmission segment of the drive unit to the drive shaft, in particular by means of a V-belt and/or a chain.

In a further embodiment, the supporting body is connected with the drive unit. However, because the supporting arm is situated in a front area of the motor vehicle that serves only as a foot well, the energy can be transmitted from the drive unit to the drive shaft without significantly reducing the volume of the vehicle interior.

In yet a further embodiment, it proves advantageous that the second energy transmission segment of the drive unit can be decoupled from the drive unit, and manually activatable by means of an actuation element, such as journals.

As a result, the wall element can also be moved manually into the open functional position, for example from the closed functional position, e.g., should the drive unit be unable to transmit any energy to the supporting arm. This creates a redundancy for the opening and/or closing device.

In addition, in an embodiment, the wall element encompasses at least one sensor means on an edge facing the vehicle structure, in particular a touch sensor.

For example, the at least one sensor means can encompass a clamping safeguard. This prevents the opening and/or closing device from jamming a vehicle passenger between the wall element and vehicle structure.

In addition, in an embodiment the sensor means encompasses an opening means. For example, the touch sensor can detect a touch, a fingerprint or an electric key of the motor vehicle owner, and thereafter automatically move the wall element from the open functional position into the closed functional position or from the closed functional position into the open functional position.

In another embodiment, the wall element encompasses at least one sealant on an edge facing the vehicle structure.

However, the sealant can also be situated on an edge of the vehicle structure that faces the wall element.

In addition, in an embodiment a manually activatable unlocking means encompasses the first end of the at least one supporting arm and/or the first end of the at least one supporting body, and/or the manually activatable unlocking means encompasses a conical section, which at least partially envelops an unlocking section.

As a result, the wall element can be removed from the supporting arm and/or from the supporting body. The conical section provides the user with a reacher.

For example, the unlocking section can encompass a pushbutton.

In addition, in an embodiment two supporting arms are situated on the drive shaft, and the first energy transmission segment is located between the two supporting arms, in particular centrally.

Because two supporting arms and two supporting bodies are provided, and a symmetrical arrangement is achieved, the arrangement is especially stable, thereby preventing the device from jamming, in particular while moving.

In a further embodiment, two supporting arms are arranged on the drive shaft, and the first energy transmission section is between the two supporting arms, in particular centrally.

In yet a further embodiment, the at least one supporting arm and/or the at least one supporting body is connectable or connected with a steering device, wherein opening and/or closing the wall element encompasses swiveling the steering device.

The steering device can project into a passenger cabin.

According to an embodiment, the latter is provided by a steering device for a motor vehicle.

The steering device can encompass a steering box.

The steering box can be or is arranged on a vehicle component of the motor vehicle by means of a first bearing unit so that it can rotate around an axis of inclination.

In addition, an inclination adjusting unit can be provided that encompasses at least one first inclination adjustment means, with which the inclination of the steering box can be adjusted relative to the longitudinal axis of the vehicle, and with which the steering box can be moved from an operating position in which the steering box at least largely covers a foot well of the vehicle into a release position in which the foot well is opened up to allow entry or egress into or from the motor vehicle from above.

In an embodiment, the steering box incorporates a steering body, for example which encompasses a steering linkage.

In such a case, the steering body can be pivoted around a rotational axis. One end of the steering body can be provided with a steering means, for example which can encompass a steering wheel.

In the operating position, the vehicle driver can steer the motor vehicle movement with the steering device.

In an exemplary embodiment, the driver puts the steering device into operation in the release position. However, it proves advantageous for the steering device to be disabled so it cannot be commissioned when not in the operating position. This enhances the safety of the steering device.

In another embodiment, the steering device encompasses at least one second inclination adjusting means, with which the inclination of the steering box can be adjusted relative to the longitudinal axis of the vehicle in the operating position. As a result, the steering device can be individually adjusted to drivers of varying size.

In such a case, different operating positions with various angles between the steering box and longitudinal axis of the vehicle are conceivable.

In addition, in an embodiment the first inclination adjusting means and/or the second inclination adjusting means are mechanically, hydraulically and/or electrically adjusted, whether manually or automatically.

For example, if the steering box can be manually moved from the release position into the operating position or from the operating position into the release position, a locking means can manually or automatically fix the steering box in the release position and/or in the operating position.

In a further embodiment, both the first inclination adjusting means and the second inclination means are automatically adjustable.

For example, if the steering box can be manually moved from the release position into the operating position or from the operating position into the release position, a locking means can manually or automatically fix the steering box in the release position and/or in the operating position.

In addition, in an embodiment one end of the first inclination adjusting means is movably, in particular rotatably, secured to a second bearing unit arranged on the steering box, and alternately is pivoted to the vehicle component and/or an additional vehicle component.

In such a case, the steering box can be made to turn around the axis of inclination by expanding or reducing the longitudinal extension of the first inclination adjusting means.

In addition, in another embodiment the inclination adjusting unit encompasses a driving device, such as a motor, in particular an electric motor, for driving the at least one first inclination adjusting means and/or the at least one second inclination adjusting means, so as to automatically move the steering box into the release position and/or operating position and fix it in place therein, or to comfortably adjust the operating position to a driver.

It here proves especially cost-effective for the driving device to encompass in particular an electrical linear drive. The latter makes it possible to easily increase or decrease the longitudinal extension of the first inclination adjusting means.

In order to achieve a symmetrical energy progression, in an embodiment two first inclination adjusting means run parallel to each other, and the steering body is arranged between them.

The two first inclination adjusting means can be arranged on the steering box on a shared bearing axis, with which they are rotatably fixed to the steering box.

In an embodiment the steering box can be rotated around an axis of inclination to run along any location desired. In particular, it can run through or outside the steering box. The axis of inclination preferably runs transverse to the longitudinal axis of the vehicle.

A further embodiment of the steering device provides that the axis of inclination around which the steering box can be rotated encompasses the bearing axis of the first bearing unit.

It further proves expedient for the steering means to encompass at least one control element and/or one control panel.

For example, the at least one control element or control panel can encompass all electronic functions incorporated in a vehicle, usually in a center console.

In an embodiment, the release position and operating position can basically always be reset. However, it proves expedient to be able to save the operating position and release position as stored data.

In an embodiment, the inclination adjusting unit encompasses at least one control unit, which can be used to commission the driving device, the first inclination adjusting means and/or the second inclination adjusting means, in particular to move the steering box automatically into the release position and/or into the operating position and fix it in place therein. Alternatively, the driving device, the first inclination adjusting means and/or the second inclination adjusting means can be commissioned with at least one manually activatable actuation element on the steering means and/or on a vehicle component, which can be used to activate and/or deactivate the driving device, the first inclination adjusting means and/or the second inclination adjusting means in order to move the steering box into the release position and/or into the operating position and/or fix it in place therein.

For example, the vehicle component can encompass a cladding element in the vehicle interior, which can be readily accessed at any time. It further proves advantageous if the control unit can be commissioned by means of the opening and/or closing kinematics of the movable wall element, wherein the control unit actuates the driving device and/or the first inclination adjusting means in such a way while opening the wall element that the steering box is moved into the release position and fixed in place therein, and wherein the control unit actuates the driving device and/or the first inclination adjusting means in such a way while closing the wall element that the steering box is moved into the operating position and fixed in place therein.

In a further embodiment of the steering device, in the operating position, the steering box, in particular the rotational axis, runs parallel to the longitudinal axis of the vehicle, or includes an angle with the latter of 0° to 30°, particularly 0° to 20°, preferably 5° to 15°, and/or, in the release position, the steering box, in particular the rotational axis, includes an angle with the longitudinal axis of the vehicle of 30° to 90°, particularly 30° to 70°, preferably 35° to 60°.

In yet a further embodiment, a motor vehicle is provided with an opening and closing device for opening and again closing a wall element, such as a vehicle roof, in particular a dome, and with a steering device, in particular according to one of the aforementioned features, wherein a first inclination adjusting means is coupled with a supporting arm and/or with a supporting body of the opening and/or closing device in such a way that, while opening the wall element, a steering body of the steering device is moved by the first inclination adjusting means into a release position and fixed in place therein, in which the foot well is opened up to allow entry or egress into or from the motor vehicle from above, and wherein, while closing the wall element, the steering body is moved by the first inclination adjusting means into the operating position and fixed in place therein, in which the steering box at least largely covers a foot well of the vehicle.

As a result, several vehicle components are coupled together, in particular the steering device and the opening and closing device. In such a case, the steering box automatically folds up when the wall element is opened. Conversely, the steering box automatically folds down when the wall element is closed.

The opening and/or closing device proves advantageous in several regards.

Because the wall element can be moved from an open into a closed position by the at least one supporting arm and by the at least one supporting body, a user can easily enter or exit the motor vehicle from above.

Since the at least one supporting arm is shorter than the at least one supporting body, and also spaced less of a distance apart from the vehicle front, the arrangement of at least one supporting arm, at least one supporting body and wall element yields kinematics that cause a tilting motion by the wall element around the second end of the supporting arm when the latter is moved into the open functional position.

As a result, the wall element projects only slightly over the motor vehicle in the open position, making it possible to easily enter and exit even a parked vehicle, for example without damaging a vehicle parked in front of the motor vehicle.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
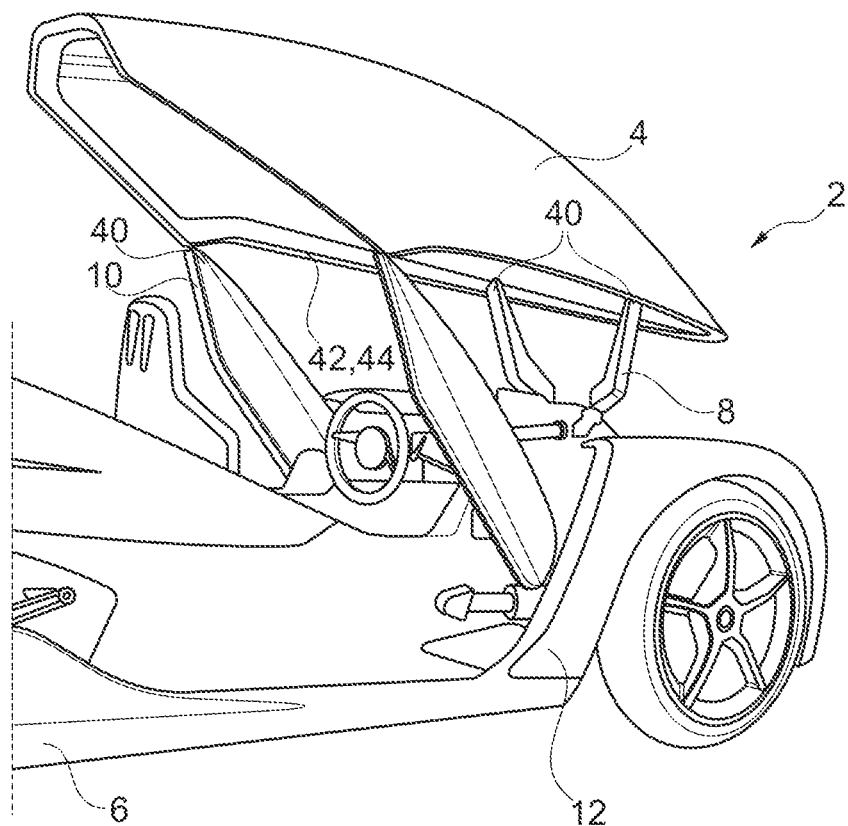
FIG. 1 is a perspective, schematic view of the opening and/or closing device according to an embodiment.

FIG. 1 shows an opening and/or closing device marked overall with reference number 2 for a movable wall element 4, such as a vehicle roof, in particular a dome, of a motor vehicle 6. In the exemplary embodiment visible on FIG. 1, the opening and/or closing device 2 encompasses two supporting arms 8 as well as two supporting bodies 10.

The two supporting arms 8 exhibit less of a longitudinal extension than the two supporting bodies 10, and are spaced less of a distance apart from the motor vehicle front than the two supporting bodies 10.

A respective first end of the two supporting arms 8 and two supporting bodies 10 is pivoted to the wall element 4, while their respective second end is pivoted to a vehicle structure 12.

Figure 4A:
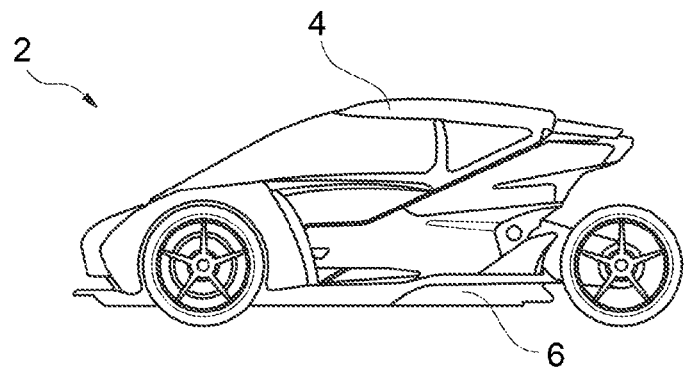
FIG. 4(a)-4(c) is a schematic, side view of a motor vehicle with the opening and/or closing device according to an embodiment in different functional positions.

By turning the two supporting arms 8 and two supporting bodies 10, the wall element 4 can be moved from an open functional position (FIG. 4c) into a closed functional position (FIG. 4a).

In the exemplary embodiment visible on FIG. 1, the supporting arms 8 and supporting bodies 10 exhibit an aligned rotational direction.

In addition, the supporting arms 8 and supporting bodies 10 are spaced apart from each other as viewed in the longitudinal direction of the motor vehicle 6.

This arrangement allows the wall element 4 to tilt around the first end of the two supporting arms 8 when moving the wall element 4 from the closed functional position into the open functional position, thereby preventing any extensive protrusion over the vehicle front.

Figure 2:
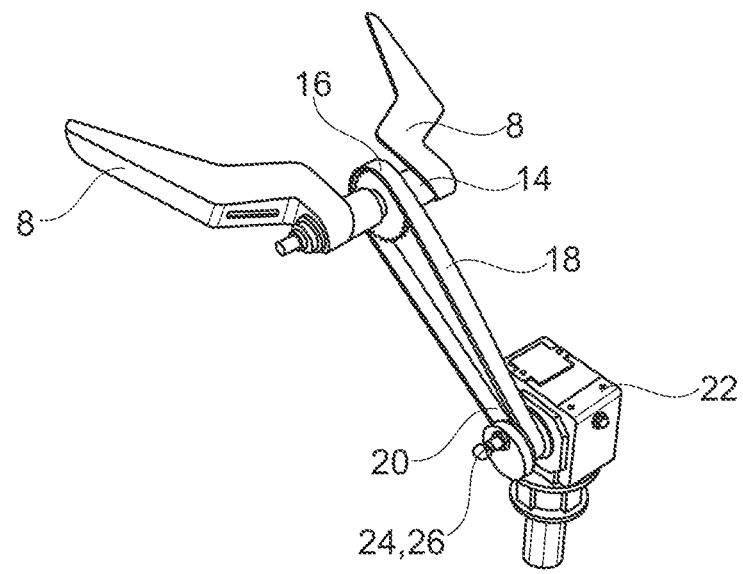
FIG. 2 is a detailed view of the supporting arm and drive unit of FIG. 1.

FIG. 2 presents a detailed view of the two supporting arms 8, which are arranged on a shared drive shaft 14 in a torque-proof manner. Situated in the middle of the drive shaft 14 is a first energy transmission segment 16, which is connected by way of a V-belt 18 to a second energy transmission segment 20 with a drive unit 22. As a result, energy can be transmitted from the drive unit 22 to the drive shaft 14, so that the wall element 4 can be moved from the closed functional position into the open functional position and vice versa, driven by an electric motor.

In addition, the second energy transmission segment 20 of the drive unit 22 is provided with an actuation element 24 that encompasses a journal 26. The latter can be manually activated. As a result, the wall element 4 can be moved from the closed functional position into the open functional position, even given a failure of the drive unit 22.

Figure 3:
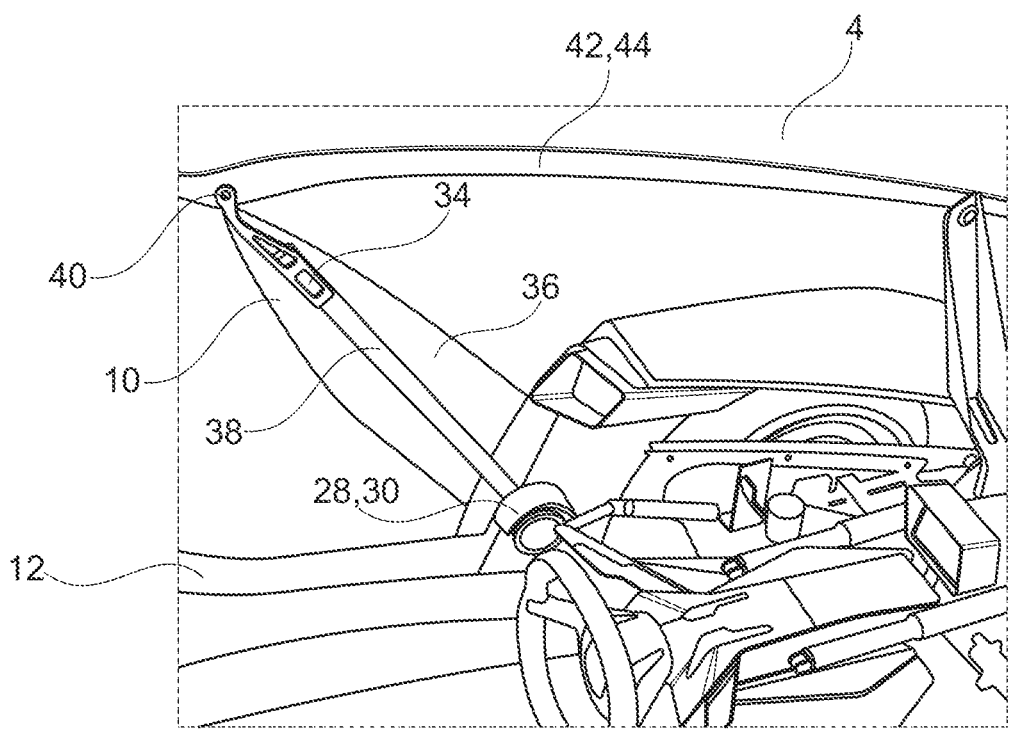
FIG. 3 is a detailed view of the supporting body with damping element.

FIG. 3 presents a detailed view of the supporting body 10 according to an embodiment. The second end of the latter exhibits a supporting body bearing means 28, with which it is secured to the vehicle structure 12. In the exemplary embodiment illustrated on FIG. 3, the supporting body bearing means 28 is comprised of a roller bearing 30.

In addition, the second end of the supporting body 10 is connected with a damping means 34, which abuts against the second end of the supporting body 10 on the one hand, while the other end abuts against the vehicle structure 12. This dampens a rotational movement of the supporting body 10, and yields a soft movement for the system consisting of supporting bodies 10, supporting arms 8 and wall element 4.

The supporting body 10 encompasses a jacket 36 that envelops a cavity, so that the supporting body can be designed to take up a lot of space, without having to be made particularly heavy in the process. In such a case, the jacket 36 serves as a lateral wall section.

The forces acting on the supporting body 10 are here absorbed by a bearing structure 38. In addition, the first ends of the supporting arms 8 and first ends of the supporting body 10 each are provided with an unlocking means 40, with which the wall element 4 can be separated from the supporting arms 8 or supporting bodies 10.

In the exemplary embodiment visible on FIGS. 1 and 3, an edge of the wall element 4 is provided with both a sensor means 42 and a sealing element 44. The sensor means 42 provides a clamping safeguard, so that a user cannot become jammed in by the wall element 4, for example when moving the wall element 4 from the open functional position into the closed functional position.

The sealing means 44 can be used to outwardly seal the vehicle interior airtight and watertight with the wall element 4 in the closed functional position.

Figure 4B:
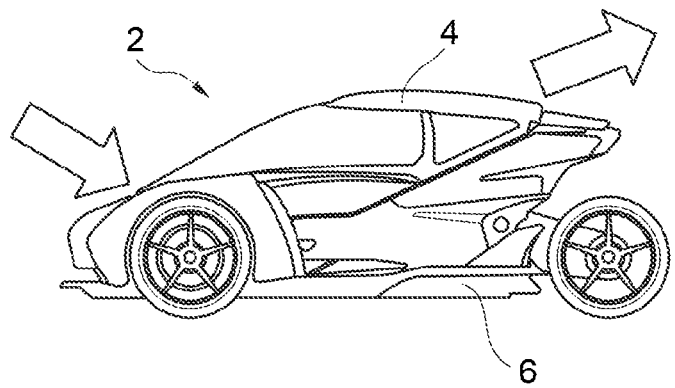
Figure 4C:
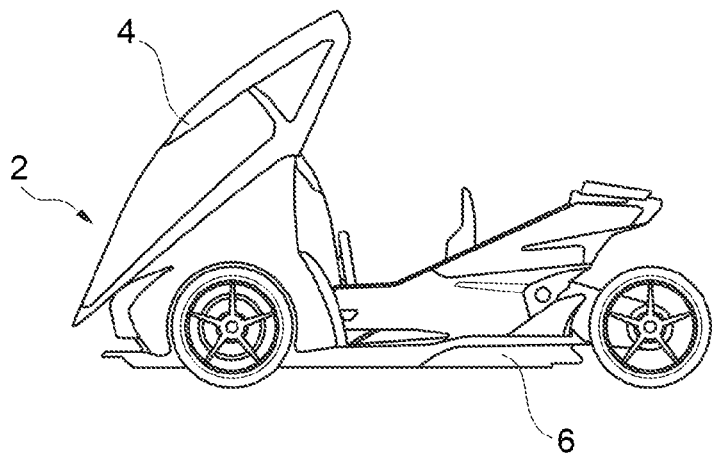

FIGS. 4(a), 4(b) and 4(c) show the motor vehicle 6 with the opening and/or closing device 2 in different functional positions.

FIG. 4(a) depicts the opening and/or closing device 2 in the closed functional position of the wall element 4. In the latter, the sealing element 44 of the wall element 4 tightly abuts against the vehicle structure 12 of the motor vehicle 6.

FIG. 4(b) depicts the opening and/or closing device 2 in a ventilation position, in which a gap is formed between the wall element 4 and vehicle structure 12. This makes it possible to replace the air in the vehicle interior with air from the environment.

FIG. 4(c) depicts an opening and/or closing device 2 in the open position, in which a vehicle driver can enter or exit the motor vehicle from above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An opening and closing device for a movable, flexurally rigid and at least regionally transparent wall element of a motor vehicle, the opening and closing device comprising:
   at least one supporting arm;
   at least one supporting body, wherein the at least one supporting arm and the at least one supporting body encompass a first end that faces the wall element and is pivoted to the wall element, and encompass a second end that faces away from the wall element and is pivoted to a vehicle structure,
   wherein, by turning the at least one supporting arm and the at least one supporting body, the wall element is moved from an open functional position, in which a vehicle interior is accessible from outside for entry and egress and in which the wall element is situated in a frontal area of the motor vehicle, into a closed functional position, in which the vehicle interior is sealed to the outside by the wall element, and
   wherein the second end of the at least one supporting body exhibits a supporting body bearing means, which consists in particular of a roller bearing.

2. The opening and closing device according to claim 1, wherein the at least one supporting body forms at least one lateral wall section of the motor vehicle at least in the closed functional position of the wall element.

3. An opening and closing device for a movable, flexurally rigid and at least regionally transparent wall element of a motor vehicle, the opening and closing device comprising:
   at least one supporting arm;
   at least one supporting body, wherein the at least one supporting arm and the at least one supporting body encompass a first end that faces the wall element and is pivoted to the wall element, and encompass a second end that faces away from the wall element and is pivoted to a vehicle structure,
   wherein, by turning the at least one supporting arm and the at least one supporting body, the wall element is moved from an open functional position, in which a vehicle interior is accessible from outside for entry and egress and in which the wall element is situated in a frontal area of the motor vehicle, into a closed functional position, in which the vehicle interior is sealed to the outside by the wall element,
   wherein he at least one supporting arm and the at east one supporting body are capable of moving the wall element from the open functional position into the closed functional position, either manually or driven, wherein the at least one supporting arm or the at least one supporting body is actuated by a drive unit equipped with a motor; and
   wherein the motor is an electric motor.

4. An opening and closing device for a movable, flexurally rigid and at least regionally transparent wall element of a motor vehicle, the opening and closing device comprising:
   at least one supporting arm;
   at least one supporting body, wherein the at least one supporting arms and the at least one supporting body encompass a first end that faces the wall element and is pivoted to the wall element, and encompass a second end that faces away from the wall element and is pivoted to a vehicle structure,
   wherein, by turning the at least one supporting arm and the at least one supporting body, the wall element is moved from an open functional position, in which a vehicle interior is accessible from outside for entry and egress and in which the wall element is situated in a frontal area of the motor vehicle, into a closed functional position, in which the vehicle interior is sealed to the outside by the wall element, and
   wherein the at least one supporting body forms at least one lateral wall section of the motor vehicle at least in the closed functional position of the wall element.

5. The opening and closing device according to claim 4, wherein the at least one supporting arm and the at least one supporting body are spaced apart from each other as viewed in a longitudinal direction of the motor vehicle, and the at least one supporting arm is spaced less of a distance apart from the vehicle front than the at least one supporting body.

6. The opening and closing device according to claim 4, wherein the at least one supporting arm and the at least one supporting body exhibit the same or a mutually deviating longitudinal extension, and wherein the at least one supporting arm exhibits less of a longitudinal extension than the at least one supporting body.

7. The opening and closing device according to claim 4, wherein the wall element can he fixed in a ventilation position, in which a gap is formed between the wall element and the vehicle interior.

8. The opening and closing device according to claim 4, wherein the wall element encompasses at least one sensor means on a wall facing the vehicle structure.

9. The opening and closing device according to claim 4, wherein the wall element encompasses at least one sealant on a wall facing the vehicle structure.

10. The opening and closing device according to claim 4, further comprising a manually activatable unlocking means that encompasses the first end of the at least one supporting arm or the first end of the at least one supporting body, and wherein the manually activatable unlocking means encompasses a conical section that at least partially envelops an unlocking section.

11. The opening and closing device according to claim 4 wherein the wall element is a vehicle roof of the motor vehicle.

12. The opening and closing device according to claim 11 wherein the vehicle roof is a dome.

13. The opening and closing device according to claim 4, wherein the at least one supporting arm and the at least one supporting body are capable of moving the wall element from the open functional position into the closed functional position, either manually or driven, and wherein the at least one supporting arm or the at least one supporting body is actuated by a drive unit equipped with a motor.

14. The opening and closing device according to claim 13, wherein the at least one supporting arm and the at least one supporting body are capable of moving the wall element from the open functional position into the closed functional position, either manually or driven, continuously.

15. The opening and closing device according to claim 4, wherein the at least one supporting arm comprises two supporting arms and wherein the at least one supporting body comprises two supporting bodies and wherein the two supporting arms and the two supporting bodies are arranged symmetrically to a longitudinal plane of the motor vehicle.

16. The opening and closing device according to claim 15, wherein the two supporting arms are situated on a drive shaft, and a first energy transmission segment is located between the two supporting arms.

17. The opening and closing device according to claim 4, wherein the second end of the at least one supporting arm is arranged on a drive shaft in a torque-proof manner, which encompasses at least a first energy transmission segment which can transmit energy from a second energy transmission segment of a drive unit to the drive shaft.

18. The opening and closing device according to claim 17, wherein the first energy transmission segment is a toothed wheel.

19. The opening and closing device according to claim 17, wherein the second energy transmission segment of the drive unit can be decoupled from the drive unit, and manually activatable by means of an actuation element.

* * * * *